United States Patent
Keukens

(10) Patent No.: US 10,924,142 B1
(45) Date of Patent: Feb. 16, 2021

(54) RF LEVEL DETECTION FOR DESIRED CHANNEL AMONG MULTIPLE BROADCAST CHANNELS

(71) Applicant: NXP B.V., Eindhoven (NL)

(72) Inventor: Erik Keukens, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/855,762

(22) Filed: Apr. 22, 2020

(51) Int. Cl.
*H04B 1/16* (2006.01)

(52) U.S. Cl.
CPC .................................. *H04B 1/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,345,187 A * | 9/1994 | McGuire | .................. | H03D 3/00 329/302 |
| 2007/0002932 A1* | 1/2007 | Shirai | ..................... | G01S 7/292 375/141 |
| 2007/0041481 A1* | 2/2007 | Malkemes | ........... | H03G 1/0088 375/345 |
| 2009/0063911 A1* | 3/2009 | Tsukio | ................. | H04B 7/0877 714/708 |
| 2015/0010046 A1* | 1/2015 | Kaizu | ..................... | H04L 27/01 375/232 |

OTHER PUBLICATIONS

U.S. Appl. No. 16/804,358, filed Feb. 28, 2020, entitled: Adjacent Channel Suppression Based on Adjacent Channel Properties in FM Radio Broadcast Receivers. The Examiner is referred to the copending patent prosecution of the common Applicant (no attachment).
U.S. Appl. No. 16/804,391, filed Feb. 28, 2020, entitled: FM Spectrum Estimation Relative to Adjacent Channel. The Examiner is referred to the copending patent prosecution of the common Applicant (no attachment).
U.S. Appl. No. 16/855,741, filed Apr. 22, 2020, entitled: Bandwidth Control in Radio Frequency Broadcast Signals Relative to Adjacent-Channel Signal Properties. The Examiner is referred to the copending patent prosecution of the common Applicant (no attachment).
U.S. Appl. No. 16/855,698, filed Apr. 22, 2020, entitled: Smart Adjacent-Channel Indicating/Scanning for FM Modulation. The Examiner is referred to the copending patent prosecution of the common Applicant (no attachment).

* cited by examiner

*Primary Examiner* — Junpeng Chen
(74) *Attorney, Agent, or Firm* — Rajeev Madnawat

(57) ABSTRACT

Exemplary aspects are directed to FM-radio receivers and methods to assess signals in a desired channel. In one example, a method includes demodulating a broadcast signal associated with a radio-frequency transmission using a desired-channel bandwidth setting and, in response, provide a first frequency-selective demodulated signal (e.g., MPX signal in an FM broadcast) and provide a magnitude indication, such as the raw signal level, of a second demodulated signal that is less frequency selective than the first frequency-selective demodulated signal. A level estimation circuit is used to assess a running representation (or effective average) of the magnitude indication over time. In this manner, a speed or rate at which the level estimator assesses the running representation is controlled based on a degree of deviation or offset as indicated by the first frequency-selective demodulated signal relative to a carrier frequency used for the broadcast signal.

20 Claims, 1 Drawing Sheet

US 10,924,142 B1

RF LEVEL DETECTION FOR DESIRED CHANNEL AMONG MULTIPLE BROADCAST CHANNELS

OVERVIEW

Aspects of the present disclosure are directed to deriving an accurate estimate of the signal level of a desired channel of an RF (radio frequency) signal such as a frequency modulated (FM) signal. These signals are exemplified, for example, in FM radio broadcast communications systems in which the desired reception channel is selected for capturing data carried by the FM signal, in the presence of one or more possibly-interfering adjacent channels.

In such broadcast communications systems, accurately receiving and capturing the information provided by the carrier frequency is important. This is often achieved based on a general understanding of the surrounding frequency spectrum and by avoiding overlap and interference from other signals in the adjacent spectrum. Consider such an adjacent signal, for example, in the common radio broadcast systems where channel spacing is fixed (e.g., at 100 kHz or 200 kHz in FM systems). In such radio systems, for example, interference often occurs from nearby broadcast radio signals (or channels) and the deviation of one of these adjacent broadcast signal may readily interfere with the other. One part of mitigating or at least measuring this interference is by achieving a true measure of the desired channels signal. This true measure may then be used to adjust the IF bandwidth and/or the carrier offset in the mixer. The signal level may be more-readily detected in cases where there is no adjacent channel, but where there are adjacent channel present, interference from such adjacent channels often adversely affect the measured signal level of the signal in the desired channel. While various analog and/or digital signal processing techniques for estimating a true signal level have evolved over time, these above-mentioned interference problems can still occur.

Various examples are directed to issues such as those addressed above and/or others which may become apparent from the following disclosure concerning a broadcast signal associated with a radio-frequency transmission.

In particular examples relating to the present disclosure, aspects are directed to methods and related circuitries involving demodulating and/or processing already-demodulated broadcast signals associated with a RF transmissions with desired-channel bandwidth settings being used for receiving the associated RF broadcast signals and assessing certain signal properties therefrom.

In one example, a method includes demodulating a broadcast signal associated with a radio-frequency transmission using a desired-channel bandwidth setting and, in response, providing a first frequency-selective demodulated signal (e.g., MPX signal in an FM broadcast) and providing a magnitude indication, such as the raw signal level, of a second demodulated signal that is less frequency selective than the first frequency-selective demodulated signal. A level estimation circuit is used to assess a running representation (or effective average) of the magnitude indication over time. In this manner, a speed or rate at which the level estimator assesses the running representation may be controlled based on a degree of deviation or offset as indicated by the first frequency-selective demodulated signal relative to a carrier frequency used for the broadcast signal.

According to one example, the present disclosure is directed to a method and related radio-signal receiver circuitry which uses information derived from a demodulated, adjusted to a desired channel, to calculate signals and parameters that may be used for a level detector circuit. In this instance, the level detector circuit may be configured to output an improved estimate of the true channel signal level or magnitude. This improved estimate can then be used by various circuits of the receiver.

In another specific example, the level estimating circuitry may refer to or include a quasi-peak detector (QPD). The QPD may be considered a leaky peak detector in that the detector is configured to process and hold the peak only for a short period of time in light of the continuous or regular update changes for time-based average of the desired channel level.

In yet another specific example embodiment, the level estimation circuitry may be controlled by two parameters derived from a demodulator (e.g., MPX, and a wideband/raw—signal level). These signals are then used by a level estimating circuit to assess (e.g., calculate) a running estimate of the signal level over time. The level detector circuit may then output an improved estimate of the true channel signal level or magnitude, and this in turn may be used as an indication of received signal quality or an indication of degree of signal magnitude, relative to noise or interference. This signal may be further used in connection with the RF level output to provide control over or feedback for the bandwidth selection for providing an intermediate frequency (IF) signal.

The above discussion of examples is not intended to describe each embodiment or every implementation of the present disclosure.

BRIEF DESCRIPTION OF FIGURES

Various example embodiments may be more completely understood in consideration of the following detailed description in connection with the accompanying drawings, in which.

Figure 1:
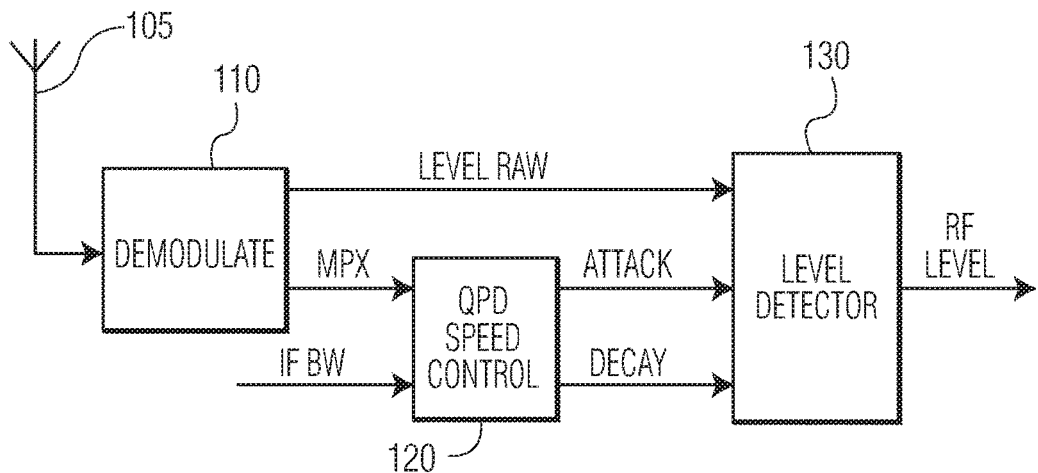
FIG. 1 is a circuit-based block diagram of a radio-frequency (RF) receiver, illustrating an example apparatus in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving reception and/or processing of a desired channel or signal ensuing from an RF (radio frequency) broadcast transmission. This type of transmission may occur, for example, by way of the broadcasting from radio transmitters operated on behalf of publicallybroadcast FM radio stations. While aspects of the present disclosure have been shown to be beneficial when used in the context of such FM radio broadcast signals and while the following discussion uses this context as examples to understand such aspects, the present disclosure is not necessarily so limited.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment may be combined with features of another figure or embodiment even though the combination is not explicitly shown or explicitly described as a combination.

In specific examples according to the present disclosure, embodiments involve processing an RF broadcast signal (e.g., as received via an FM radio broadcast transmission) in a frequency spectrum having separable segments respectively corresponding to different channels associated with the broadcast radio signals. As is conventional, the information relevant to the broadcast is carried by modulating a carrier signal, sometimes the desired signal or channel; this desired channel may be typically selected by setting the bandwidth known, from historical or empirical evidence, to correspond to the frequency of the carrier signal and to avoid interference energy from adjacent channels. As noted previously, however, it is often a challenge to select the proper range for this bandwidth so that only the energy of the desired channel is captured. In connection with the present disclosure and for certain example embodiments, it has been discovered that such proper bandwidth range selection may be realized by measuring certain signal properties of the desired channel and effecting the setting to select the proper range for this desired bandwidth, by the use of these measured properties. Various methods may be used to derive measured signal properties advantaging such a system.

As one example, a desired FM broadcast signal is demodulated within a certain bandwidth for the desired channel. In this example, circuitry within the demodulator derives two signals. The first signal is a frequency-selective signal (e.g. MPX). The second derived signal is a related signal which is not as frequency-selective signal and which represents a magnitude indication (or raw level) of the demodulated signal. This magnitude indication uses a level estimation to calculate a running representation, or average, of the magnitude as the signal changes over time. Further, in this example, these two derived signals may be used by a controller or logic circuit to control the speed, or rate, at which the estimator assesses the running representation. This control may be based on the degree of deviation, or offset, as measured by the frequency-selective signal (e.g., MPX in an FM system) relative to the carrier frequency used for the broadcast signal.

In connection with experimental embodiments, it has been shown that when such methodology is applied in environments where such adjacent signals have or be susceptible to overlapping spectrum, a significantly more-reliable level-indication is realized. This realization is especially evident and advantageous for systems using less-than-perfect adjacent-channel suppression algorithms where a likelihood of inadvertently measuring the adjacent channel energy is much higher and, more generally, where adjacent-channel breakthrough may be expected.

In certain examples according to the present disclosure, RF level estimation circuitry is used, for example including a quasi-peak detector (QPD), to provide an indication of the RF signal level regularly updated over time. Depending on the receiver, this indication may also be updated with bandwidth changes. The generated output signal of the level estimation circuitry indicates a magnitude of the received RF signal. The level estimation circuitry output gives an indication of the quality of information carried by and demodulated from the carrier frequency as the output signal indicates a degree of signal magnitude, relative to noise or interference, for information carried by and demodulated from the carrier frequency. This example may further include using the level estimation circuitry to provide control over, or feedback for, the bandwidth selection of an intermediate frequency (IF) signal as a mix of the incoming broadcast signal with another oscillator signal towards obtaining a baseband signal.

Turning now to the drawings and relating to the above-disclosed aspects and embodiments, FIG. 1 illustrates an example of FM radio receiver circuitry showing a specific approach for generating a signal indicating RF level of the desired channel of a FM radio transmission, consistent with some of the above-discussed aspects and features including measurement of and reliance on measured properties of received channel and information on the current selected bandwidth (BW). It will be appreciated, however, that other circuits may also be used.

The example illustrated in FIG. 1 includes three circuit-based blocks: a demodulator 110; a QPD speed control 120; and a level detector 130. Starting from the left side of FIG. 1, the FM broadcast signals are received by antenna 108 which passes the RF signals to the demodulator circuitry 110. The demodulator processes the wide bandwidth signal by combining or mixing it with an oscillator signal (not shown). Using known circuitry and methods, this mixed signal is processed to create a band limited IF signal which contains the desired FM channel signal. The bandwidth of the IF may be controlled by an external signal which is generated with a reliance on measured properties of the currently received channel.

Also in connection with the above example, the demodulator 110 may include circuitry to generate two output signals. The first output signal from the demodulator refers to or may include the level of the raw signal (e.g., level raw or raw level) which is a signal representing the current signal level of the entire selected IF bandwidth and which may be generated by various known methods such as by taking the absolute value of the IF bandlimited signal and applying an averager (or a circuit configured to provide an average of the input) to the resultant signal. The length of the averager may be used to control the rate of change, or the response time, of the raw level output signal.

The second output signal from the demodulator is MPX level signal. This signal represents the signal level of the MPX portion in the selected FM channel being received. This may be generated in the demodulator by applying a bandpass filter to the IF bandlimited signal. This bandpass filter is designed to encompass only the MPX portion of the selected channel. The signal level of this MPX portion can then be generated by various, well understood, methods such as taking the absolute value of the MPX bandlimited signal and applying an averager to this resultant signal.

Referring again to the above example, the QPD control circuitry 120 receives, as inputs, the MPX level previously described and an IF BW signal. The IF BW signal represents, in digital or analog form, a value indicating the current IF bandwidth size being used by the demodulator, and other receiving circuits in the FM receiver. The IF bandwidth is generated by circuitry of a FM receiver. This circuitry may monitor properties of the received FM signal including, but not limited to, adjacent channel interference, RF level as shown as an output in FIG. 1, etc. The IF bandwidth adjustment may be used to improve the quality of reception of the selected FM channel, aid in generating metrics of the selected RF channel, etc.

The QPD speed control circuitry 120 uses the two input signals described above and generates two output signals for providing control via a quasi-peak detector also used in connection with the level detector 130. The above-noted two output signals from the QPD speed control circuitry 120 are the attack signal and the decay signal. In this context, the quasi-peak detector may provide and adjust an attack rate signal or decay rate signal depending on whether input signal is rising or falling, and the attack and decay rates may be made adjustable by adaptively setting the attack and decay values as represented by the QPD speed control 120 output signals.

These attack and decay signals may be derived based in part on the deviation of the desired signal as reflected by the MPX signal. One example way for measuring deviation in this regard is to use the MPX signal spectrum to provide an indication of the deviation. If the signal level at higher frequencies are larger than expected, such as when compared to the pilot tone, then the deviation is high; whereas if the signal level at higher frequencies are small relative to the pilot tone then the deviation is high.

Using this deviation value described above, the following may be applied to the attack and decay output signals. For small deviation values the bandwidth may only contain the wanted signal, in which instance a fast attack is used. Small deviation values also occur when the signal is outside the filter bandwidth. For example, the average of a low pass filtered white noise may be 0; thus the decay is set to be slow. For large deviation values, there is a significant chance that the adjacent channel dominates the signal. The attack is set to be slow so as not to measure energy of the adjacent to much. For larger deviation, the situation may be that at least the wanted channel is within the available bandwidth, thus the decay may be set faster. If the deviation is caused by adjacent channel breakthrough, this settings may have no effect.

Continuing with the above example, the level detection circuit uses three signal inputs: a) the raw level signal from the demodulator 110; b) the attack signal from the QPD speed control 120; and c) the decay signal from the QPD speed control 120. The level detector can now set the internal quasi peak detector circuitry with the attack and decay values as suggested by the input attack and decay signals. The raw level signal, representing a current level of signal in the selected bandwidth, can then be filtered through the configured quasi-peak detector to give an adjusted estimate of the desired channels signal level. This is represented by the RF level output signal. Again, this is just one example of circuitry to perform the associated function. The RF level output signal may then be used in further receiver circuitry to adjust the bandwidth used in the demodulator in an effort to improve FM radio performance. The RF level output signal may also be used to provide a visual indication of receiver performance on receiving the desired channel.

Figure 2:
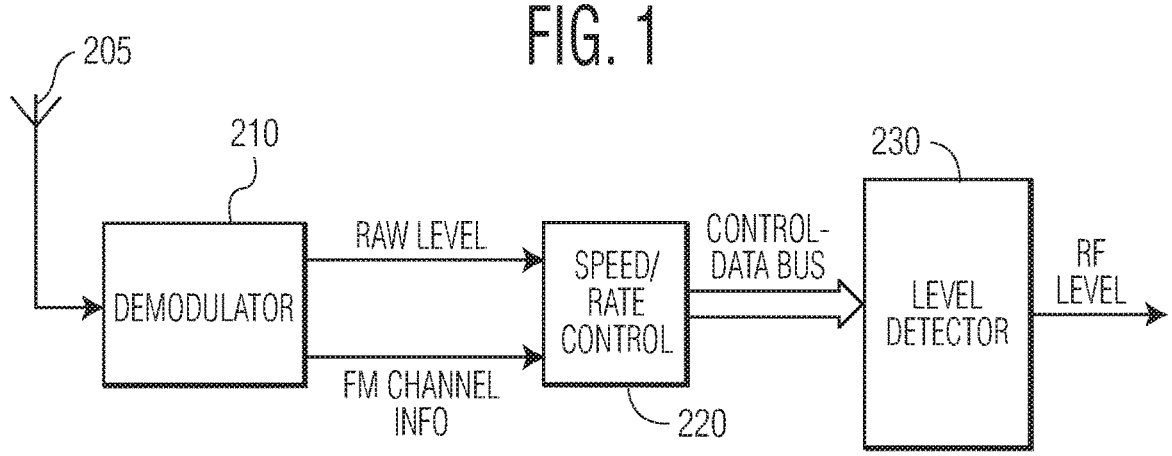
FIG. 2 is another circuit-based block diagram of a RF radio receiver, illustrating a generalized example apparatus in accordance with the present disclosure.

FIG. 2 illustrates a more general example of an FM radio circuitry used to generate an output signal that may be used to improve the quality of the received FM channel. The circuitry includes three parts: a) a demodulator circuit; b) a speed/rate control circuit; and c) a level detection circuit. The demodulator 210 mixes the wide bandwidth signal with an oscillator signal (not shown). Using known circuitry and methods, this mixed signal is processed to create a band limited IF signal which contains the desired FM channel signal. The bandwidth of the IF may be controlled by an external signal which is generated with a reliance on measured properties of the currently received channel.

The above-noted demodulator 210 may also contain circuitry to generate two output signals. The first output signal from the demodulator is the raw level signal which is a signal representing the current signal level of the entire selected IF bandwidth. The first output signal may be generated by various known methods including, for example, taking the absolute value of the IF band limited signal and applying an averager to this resultant signal. The length of the averager may be used to control the rate of change, or the response time, of the raw level output signal.

The second output signal from the demodulator is the FM channel information signal, in this example. This signal contains information about the selected FM channel being received. The information contained in this signal may include items such as the bandwidth currently used in the demodulator to receive the desired channel, the frequency deviation of the current desired channel being received by the demodulator 210. The FM channel information signal may also include, for examples, other items such as status of adjacent channel(s) breakthrough(s), and/or current IF frequency offset used to move the IF frequency away from an offending adjacent channel, and/or the demodulated FM signal of the selected channel, and/or the MPX signal. Note that the FM channel information signal may include various combinations of the above examples as well as other items not revealed in this document.

The two output signals, the raw level signal and the FM channel information signal, generated by the demodulator 210, pass into the speed/rate control circuitry block 220. This block 220 uses the signals from the demodulator 210 to generate control data that may be shared over a control data bus (or control data bus signals). This signal may include derived parameters such as attack and decay setting for a quasi-peak detector that may be used in the level detector circuitry 230, and may also include items such as a statistical measure of the various levels of the raw level signal (in either or both time and frequency domain), measured over a period of time (for example over the last 1 ms or last 1 seconds).

The control data bus signals generated by the speed/rate control circuitry are used to assist the level detector circuitry block 230 in generating an output signal that represents an more accurate, or meaningful, estimate of the received signals than the raw level signal from the demodulator indicates. One example method is the use of a QPD as described in FIG. 1. Another example method may involve use of a convolutional neural network (CNN) or a recurrent neural network (RNN) trained to estimate the RF level using various parameters from the control data bus signals. Yet another example may be a temporal filter that adjusts its output as follows: if the input is above a defined threshold level its output is increased by a defined percentage; if the input is below a defined threshold level its output is decreased by a defined percentage. This gives a smooth effect while removing impulse noise from the incoming signal or raw level signal. The threshold, increase percentage, and decrease percentage may be derived from the information via the control data bus.

Figure 3:
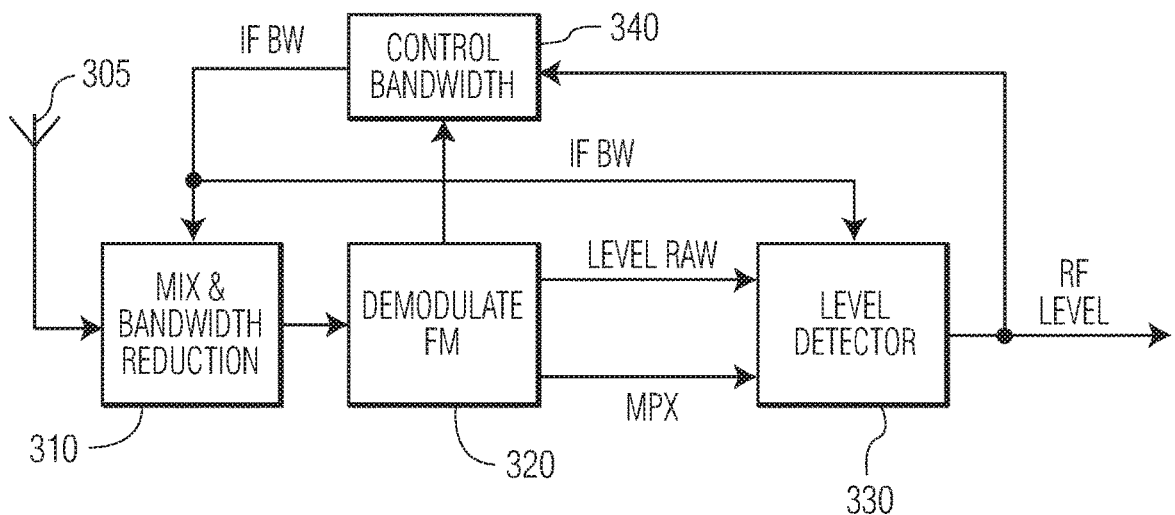
FIG. 3 is yet another circuit-based block diagram of a RF radio receiver, illustrating another example apparatus in accordance with the present disclosure.

FIG. 3 illustrates a more specific example related to each of the above-presented examples. In FIG. 3, an antenna 305 receives the broadband RF signal for presentation to the mix and bandwidth reduction block 310, which may be used to perform an IF-mixing operation on the incoming signal. In this example, block 310 also performs a bandwidth reduction using a digital or analog bandpass filter. The setting for the bandpass filter may be provided by the derived signal from the control bandwidth block 340.

Following this signal flow of FIG. 3, the output from the mix and bandwidth reduction block 310 is used as an input to drive a demodulation FM block 320 to perform FM demodulation of this signal generating and provide three outputs, the first being a raw level signal, representing a full bandwidth signal level measurement. The output is passed to a level detector 330. A second output is another demodulator output signal (e.g., MPX in an FM system) which is also sent to the level detector 330.

A third output signal is sent to the control bandwidth block 340. This output signal contains measured signal parameters, pertaining to channel impairments, useful to the control bandwidth block 340 for estimating an updated (or new) bandwidth setting. The level detector block 330 uses the incoming raw level signal (or MPX) and the IF BW signal, as provided from the control bandwidth block 340, to create an updated estimate of the RF level. The updated estimate may be used by external circuitry in various ways such as: to indicate and/or display the quality of the incoming signal such as in a testing mode; to aid in a channel scanning algorithm; to provide adjustments to other receiver circuit (not shown); etc.

Using the level detector block 330 in FIG. 3, the RF level signal is used as an input to the control bandwidth block 340. Using the two input signals, the control bandwidth block 340 generates an updated desired bandwidth to improve signal quality. The updated bandwidth signal is then output from the control bandwidth block 340 and delivered to the mix and bandwidth reduction block 310 as well as the level detector 330.

Accordingly, the Specification presents a description with exemplary aspects useful for implementing the claimed disclosure by way of various circuits or circuitry as may be using in connection with illustrations and terms such as blocks, modules, and/or other circuit-type depictions (e.g., reference numerals 110, 120 and 130 of FIG. 1 depict a block/module as described herein). Such circuits or circuitry are used together with other elements to exemplify how certain embodiments may be carried out in the form or structures, steps, functions, operations, activities, etc. As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . "). In connection with examples in which such circuits or circuitry may correspond to logic circuitry that may refer to or include a code-programmed/configured CPU, such logic circuitry may carry out a process or method by performing one or more of the steps as set forth in the above examples (and/or claims that follow).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims

What is claimed is:

1. An method comprising:
   demodulating a broadcast signal associated with a radio-frequency (RF) transmission, using a bandwidth setting for a desired channel that is among a plurality of broadcast channels and, in response, provide a first frequency-selective demodulated and provide a magnitude indication of a second demodulated signal that is less frequency selective than the first frequency-selective demodulated signal;
   using a level estimation circuit to assess a running representation of the magnitude indication over time; and
   controlling a speed or rate at which the level estimator assesses the running representation based on a degree of deviation or offset as indicated by the first frequency-selective demodulated signal relative to a carrier frequency used for the broadcast signal.

2. The method of claim 1, wherein the broadcast signal is a frequency modulated (FM) signal, the first frequency-selective demodulated signal is an MPX signal, and wherein the first frequency-selective demodulated signal and second demodulated signal correspond to demodulated versions of the broadcast signal for the desired channel with the second demodulated signal encompassing a wider spectrum than a spectrum used for the first frequency-selective demodulated signal.

3. The method of claim 1, wherein the level estimation circuit includes a quasi-peak level detector, and wherein the magnitude indication over time is updated regularly.

4. The method of claim 1, wherein the level estimation circuit assesses the running representation by processing the magnitude indication of a second demodulated signal based on changes associated with: an IF bandwidth used for demodulating the broadcast signal and the first frequency-selective demodulated signal.

5. The method of claim 1, wherein the level estimation circuit generates an output to indicate a magnitude of the received RF transmission.

6. The method of claim 1, wherein the level estimation circuit generates an output to indicate a magnitude of the received RF transmission, and further including using the output to indicate a quality of information carried by and demodulated from the carrier frequency.

7. The method of claim 1, wherein the level estimation circuit generates an output to indicate a magnitude of the received RF transmission, and further including using the output to indicate a degree of signal magnitude, relative to noise or interference, for information carried by and demodulated from the carrier frequency.

8. The method of claim 1, further including using a logic circuit, responsive to the first frequency-selective demodulated signal, for said controlling a speed or rate at which the level estimator assesses the running representation.

9. The method of claim 1, further including mixing a representation of the broadcast signal and another oscillating signal to provide an intermediate frequency (IF) signal.

10. The method of claim 1, wherein the level estimation circuit generates an output to indicate a magnitude of the received RF transmission, and further including using the output to provide control over or feedback for the bandwidth selection for providing an intermediate frequency (IF) signal.

11. The method of claim 1, further including mixing a representation of the broadcast signal and another oscillating signal to provide an intermediate frequency (IF) signal, wherein the level estimation circuit generates an output to indicate a magnitude of the received RF transmission, and further including using the output to provide control over or feedback for bandwidth selection used in said mixing to provide the IF signal.

12. An apparatus comprising:
a demodulator to demodulate a broadcast signal associated with a radio-frequency (RF) transmission, using a bandwidth setting for a desired channel that is among a plurality of broadcast channels and, in response, to provide a first frequency-selective demodulated signal and to provide a magnitude indication of a second demodulated signal that is less frequency selective than the first frequency-selective demodulated signal;
a level estimation circuit to assess a running representation of the magnitude indication over time; and
a logic circuit to control a speed or rate, at which the level estimation circuit is to assess the running representation, based on a degree of deviation or offset as indicated by the first frequency-selective demodulated signal relative to a carrier frequency used for the broadcast signal.

13. The apparatus of claim 12, further including a frequency modulated (FM) radio receiver including the demodulator, the level estimation circuit, and the logic circuit, and wherein the first frequency-selective demodulated signal is an MPX signal, and wherein the first frequency-selective demodulated signal and second demodulated signal correspond to demodulated versions of the broadcast signal for the desired channel with the second demodulated signal encompassing a wider spectrum than a spectrum used for the first frequency-selective demodulated signal.

14. The apparatus of claim 12, wherein the level estimation circuit includes a quasi-peak level detector.

15. The apparatus of claim 12, wherein the level estimation circuit assesses the running representation by processing the magnitude indication of a second demodulated signal based on changes associated with: an IF bandwidth used for demodulating the broadcast signal and the first frequency-selective demodulated signal.

16. The apparatus of claim 12, wherein the level estimation circuit is to generate an output to indicate a magnitude of the received RF transmission.

17. The apparatus of claim 12, wherein the level estimation circuit is to generate an output to indicate a magnitude of the received RF transmission, and further including using the output to indicate a quality of information carried by and demodulated from the carrier frequency.

18. The apparatus of claim 12, wherein the level estimation circuit generates an output to indicate a magnitude of the received RF transmission, to indicate a degree of signal magnitude, relative to noise or interference, for information carried by and demodulated from the carrier frequency, and to provide control over or feedback for the bandwidth selection for providing an intermediate frequency (IF) signal.

19. The apparatus of claim 12, further including using a logic circuit, responsive to the first frequency-selective demodulated signal, as an input to the logic circuit to control a speed or rate at which the level estimation circuit is to assess the running representation.

20. The apparatus of claim 12, further including a mixer to combine a representation of the broadcast signal and another oscillating signal to provide an intermediate frequency (IF) signal.

* * * * *